(12) United States Patent
Baria et al.

(10) Patent No.: US 10,184,409 B2
(45) Date of Patent: Jan. 22, 2019

(54) METHOD OF OPERATING AN INTERNAL COMBUSTION ENGINE HAVING A TURBOCHARGER

(71) Applicant: GM GLOBAL TECHNOLOGY OPERATIONS LLC, Detroit, MI (US)

(72) Inventors: Riccardo Baria, Bruino (IT); Cosma Negro, Candelu (IT); Andres Cespedes Garcia, Turin (IT); Davide Di Nunno, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 15/377,327

(22) Filed: Dec. 13, 2016

(65) Prior Publication Data

US 2017/0167416 A1 Jun. 15, 2017

(30) Foreign Application Priority Data

Dec. 14, 2015 (GB) .................................. 1522071.8

(51) Int. Cl.
*F02D 41/00* (2006.01)
*F02B 37/12* (2006.01)
(Continued)

(52) U.S. Cl.
CPC ............ *F02D 41/0062* (2013.01); *F01P 7/16* (2013.01); *F02B 37/12* (2013.01); *F02B 47/08* (2013.01);
(Continued)

(58) Field of Classification Search
CPC .. F02D 41/0062; F02D 41/0007; F02D 21/08; F02D 41/06; F02D 41/064;
(Continued)

(56) References Cited

U.S. PATENT DOCUMENTS 6,230,683 B1 * 5/2001 zur Loye .................. F02B 1/12
123/27 GE
6,725,848 B2 4/2004 Ramamurthy et al.
(Continued)

FOREIGN PATENT DOCUMENTS

| GB | 2524111 A | 9/2015 |
|---|---|---|
| JP | 2006037907 A | 2/2006 |
| JP | 2014173573 A | 9/2014 |

OTHER PUBLICATIONS

Great Britain Patent Office, Great Britain Search Report for Great Britain Application No. 1522071.8, dated Jun. 10, 2016.

*Primary Examiner* — Hoang Nguyen
(74) *Attorney, Agent, or Firm* — Lorenz & Kopf, LLP (57) ABSTRACT

A method and system for operating an internal combustion engine equipped with a turbocharger and an exhaust gas recirculation pipe fluidly connecting an exhaust gas line to an air intake duct upstream of a compressor of the turbocharger is disclosed. A value of a parameter indicative of a temperature of an exhaust gas is determined, and an internal recirculation strategy of the exhaust gas is actuated if the determined value is lower than a predetermined threshold value thereof. The internal recirculation strategy includes interrupting a flowing of exhaust gas through the exhaust gas recirculation pipe, and opening an exhaust valve during an intake stroke of a piston of the internal combustion engine.

7 Claims, 4 Drawing Sheets

(51) Int. Cl.
  *F01P 7/16* (2006.01)
  *F02B 47/08* (2006.01)
  *F02D 13/02* (2006.01)
  *F02D 21/08* (2006.01)
  *F02M 26/02* (2016.01)
  *F02M 26/01* (2016.01)
  *F02M 26/06* (2016.01)
  *F02M 26/04* (2016.01)
  *F02M 26/00* (2016.01)
  *F02D 41/06* (2006.01)
  *F02M 26/05* (2016.01)

(52) U.S. Cl.
  CPC ......... *F02D 13/0261* (2013.01); *F02D 21/08* (2013.01); *F02D 41/006* (2013.01); *F02D 41/0007* (2013.01); *F02D 41/0065* (2013.01); *F02M 26/01* (2016.02); *F02M 26/02* (2016.02); *F02M 26/04* (2016.02); *F02M 26/06* (2016.02); *F02D 41/06* (2013.01); *F02D 41/064* (2013.01); *F02D 2041/0067* (2013.01); *F02M 26/05* (2016.02); *F02M 2026/004* (2016.02); *Y02T 10/144* (2013.01); *Y02T 10/18* (2013.01); *Y02T 10/47* (2013.01)

(58) Field of Classification Search
  CPC ........... F02D 2041/0067; F02D 41/006; F02D 41/0065; F02D 13/0261; F01P 7/16; F02M 26/01; F02M 26/04; F02M 2026/004; F02M 26/06; F02M 26/02; F02M 26/05; F02B 37/12; F02B 47/08; Y02T 10/144; Y02T 10/18; Y02T 10/47
  USPC ............. 60/598, 600, 602, 605.1, 605.2, 611
  See application file for complete search history.

(56) References Cited

U.S. PATENT DOCUMENTS

| | | | |
|---|---|---|---|
| 7,370,474 B2* | 5/2008 | Minami | F01N 3/0231 60/295 |
| 8,635,853 B2* | 1/2014 | Robel | F01N 3/2066 60/274 |
| 2008/0066713 A1* | 3/2008 | Megli | F01L 9/04 123/295 |
| 2009/0126706 A1* | 5/2009 | Shimoda | F01L 9/02 123/568.12 |
| 2013/0319382 A1 | 12/2013 | Horie et al. | |

* cited by examiner

METHOD OF OPERATING AN INTERNAL COMBUSTION ENGINE HAVING A TURBOCHARGER

CROSS-REFERENCE TO RELATED APPLICATION

This application claims priority to Great Britain Patent Application No. 1522071.8, filed Dec. 14, 2015, which is incorporated herein by reference in its entirety.

TECHNICAL FIELD

The present disclosure pertains to a method of operating an internal combustion engine of a motor vehicle, for example a compression-ignition engine (e.g. Diesel), wherein the internal combustion engine has a turbocharger.

BACKGROUND

An internal combustion engine (ICE) generally includes an air intake system having an intake manifold and an air duct for conveying fresh air from the environment into the intake manifold, and an exhaust system having an exhaust manifold for collecting the exhaust gasses and directing them to an exhaust gas line that conveys the exhaust gasses to the environment. The internal combustion engine may also include a turbocharger, which includes a compressor located in the air intake system for compressing the air stream flowing therein and a turbine located in the exhaust system for driving the compressor.

In order to reduce the polluting emission, some internal combustion engines, having a turbocharger, are provided with a long-route exhaust gas recirculation (EGR) system, for selectively routing back exhaust gas from the exhaust system into the air duct of the air intake system. In such a way the exhaust gas mixed with the fresh air is aspired into the engine cylinders, in order to reduce the production of nitrogen oxides ($NO_x$) during the combustion process.

Long-route EGR systems include an EGR pipe, which fluidly connects the exhaust system, downstream of an ICE particulate filter, with the air duct upstream of the compressor of the turbocharger, an EGR cooler located in the EGR pipe, and valve for regulating the flow rate of exhaust gas through the EGR pipe.

A drawback of long-route EGR systems is due to potential condensation in cold environmental condition. Indeed, during the engine warm-up phase in cold environmental condition it happens that exhaust gas mixed with the fresh air condensates generates condensation droplets which impinge on compressor wheels.

Accordingly, there is a need to prevent the condensation of the recirculated exhaust gas and thus protecting the compressor from the condensation droplets that can be generated that way.

SUMMARY

An aspect of the present disclosure provides a method of operating an internal combustion engine equipped with a turbocharger and an exhaust gas recirculation pipe fluidly connecting an exhaust gas line to an air intake duct upstream of a compressor of the turbocharger. A value of a parameter indicative of a temperature of an exhaust gas is determined, and an internal recirculation strategy of the exhaust gas is actuated if the determined value is lower than a predetermined threshold value thereof. The internal recirculation strategy includes interrupting a flowing of exhaust gas through the exhaust gas recirculation pipe, and opening an exhaust valve during an intake stroke of a piston of the internal combustion engine.

As a result, it is possible to provide a condensation preventing strategy using a variable exhaust valve actuation which avoids condensation droplets, which can impact the compressor wheels of the turbocharger, in the air intake system downstream of the junction between the exhaust gas recirculation pipe and the air intake system. Furthermore, the warm-up of the exhaust system, for example after a cold start of the internal combustion engine (and/or in cold environmental condition), may be quicker and more efficient than known methods, for example methods which provide, during the warm-up phase, for interrupting a flowing of exhaust gas through the exhaust gas recirculation pipe of the long-route (low-pressure) exhaust gas recirculation system and flowing of exhaust gas through the exhaust gas recirculation pipe of a short-route (or high-pressure) exhaust gas recirculation system. Furthermore, thanks to the faster warm-up phase, for example after a cold start of the internal combustion engine, the recirculation of the exhaust gas through the exhaust gas recirculation pipe of the long-route exhaust gas recirculation system may be initiated earlier with respect to the known methods. Again, thanks to the recirculation of the exhaust gas directly into the combustion chamber, during the warm-up phase, the unburnt hydrocarbons content exiting the combustion chamber may be reduced, having as a direct consequence the reduction of unburnt deposits of hydrocarbons that impact on the temperature controllability during a regeneration of the particulate filter.

An embodiment of the present disclosure provides that the method may determine a fuel requested quantity, and actuate the internal recirculation strategy, if the determined value of the parameter is equal to or higher than the predetermined threshold value thereof and the determined fuel requested quantity is lower than a predetermined threshold value thereof. As a result, the same effects disclosed above may be achieved also in such engine operating conditions wherein the warm-up phase of the exhaust system is ended, but an engine torque requested by the driver through the accelerator pedal is low, namely lower than a pre-calibrated threshold value thereof.

An embodiment of the present disclosure provides that the parameter may be a temperature value of a coolant of the internal combustion engine. As a matter of fact, being the coolant temperature representative of the ambient environment temperature and the exhaust gas temperature of the byproducts of combustion exhausted from the combustion chamber, this aspect of the present disclosure provides a reliable solution for determining a potential condensation in the mixture of fresh air and exhaust gas which passes the compressor to be disposed in the combustion chamber.

The proposed solution, achieving basically the same effects of the method described above, may be carried out with the help of a computer program including a program-code for carrying out, when run on a computer, the method described above, and in the form of a computer program product including the computer program. The method can be also embodied as an electromagnetic signal, the signal being modulated to carry a sequence of data bits which represent a computer program to carry out the method.

Another aspect of the present disclosure provides an internal combustion engine having a reciprocating piston defining a combustion chamber having an exhaust gas valve allowing exhaust gas to exit the combustion chamber during an exhaust stroke of the piston, a turbocharger and an exhaust gas recirculation pipe fluidly connecting an exhaust system to an air intake system upstream of a compressor of the turbocharger, and an electronic control unit configured to determine a value of a parameter indicative of a temperature of an exhaust gas, and actuate an internal recirculation strategy of the exhaust gas, if the determined value is lower than a predetermined threshold value thereof. The internal recirculation strategy includes interrupting a flowing of exhaust gas through the exhaust gas recirculation pipe, and opening the exhaust valve during an intake stroke of the piston.

As a result, it is possible to provide a condensation preventing strategy with a variable exhaust valve actuation, which avoids condensation droplets, which can impact the compressor wheels of the turbocharger, in the air intake system downstream of the junction between the exhaust gas recirculation pipe and the air intake system. Again thanks to this solution, the warm-up of the exhaust system, for example after a cold start of the internal combustion engine, may be quicker and more efficient with respect to the known methods performed by the electronic control unit, for example methods which provide, during the warm-up phase, for interrupting a flowing of exhaust gas through the exhaust gas recirculation pipe of the long-route exhaust gas recirculation system and for allowing the flowing of exhaust gas through the exhaust gas recirculation pipe of a short route EGR system. Furthermore, thanks to the faster warm-up phase after a cold start of the internal combustion engine, the recirculation of the exhaust gas through the exhaust gas recirculation pipe of the long-route exhaust gas recirculation system may be allowed earlier with respect to the known methods. Again, thanks to the recirculation of the exhaust gas directly into the combustion chamber, during the warm-up phase, the unburnt hydrocarbons content exiting the combustion chamber may be reduced, having as a direct consequence the reduction of unburnt hydrocarbons deposits that impact on the temperature controllability during a regeneration of the particulate filter.

An embodiment of the present disclosure provides that the electronic control unit may be also configured to determine a fuel requested quantity to be injected into the combustion chamber, and actuate the internal recirculation strategy, if the determined value of the parameter is equal to or higher than the predetermined threshold value thereof and the determined fuel requested quantity is lower than a predetermined threshold value thereof. Thanks to this solution, the same effects disclosed above may be achieved also in the engine operating conditions wherein the warm-up phase of the exhaust system is ended, but an engine torque requested by the driver through the accelerator pedal is low, namely lower than a pre-calibrated threshold value thereof.

An embodiment of the present disclosure provides that the internal combustion engine may further include an engine cooling system having a circulating coolant provided to cool the internal combustion engine, wherein the parameter is a temperature value of the coolant. As a matter of fact, being the coolant temperature representative of the ambient environment temperature and the exhaust gas temperature of the byproducts of combustion exhausted from the combustion chamber, this aspect of the present disclosure provides a reliable solution for determining a potential condensation in the mixture of fresh air and exhaust gas which passes the compressor to be disposed in the combustion chamber.

Another aspect of the present disclosure provides an apparatus for operating an internal combustion engine equipped with a turbocharger and an exhaust gas recirculation pipe fluidly connecting an exhaust gas line to an air intake duct upstream of a compressor of the turbocharger. In particular, the apparatus is configured to determine a value of a parameter indicative of a temperature of an exhaust gas, and actuate an internal recirculation strategy of the exhaust gas, if the determined value is lower than a predetermined threshold value thereof. The internal recirculation strategy includes interrupting a flowing of exhaust gas through the exhaust gas recirculation pipe, and opening an exhaust valve during an intake stroke of a piston of the internal combustion engine.

Thank to this solution, it is possible to provide a condensation preventing strategy with a variable exhaust valve actuation which avoids condensation droplets, which can impact the compressor wheels of the turbocharger, in the air intake system downstream of the junction between the exhaust gas recirculation pipe and the air intake system. Again thanks to this solution, the warm-up of the exhaust system, for example after a cold start of the internal combustion engine, may be quicker and more efficient with respect to the known apparatuses, for example apparatuses which provide, during the warm-up phase, for interrupting a flowing of exhaust gas through the exhaust gas recirculation pipe of the long-route exhaust gas recirculation system and for allowing the flowing of exhaust gas through the exhaust gas recirculation pipe of a short route exhaust gas recirculation system. Furthermore, thanks to the faster warm-up phase, for example after a cold start of the internal combustion engine, the recirculation of the exhaust gas through the exhaust gas recirculation pipe of the long-route exhaust gas recirculation system may be allowed earlier with respect to the known apparatuses. Again, thanks to the recirculation of the exhaust gas directly into the combustion chamber, during the warm-up phase, the unburnt hydrocarbons content exiting the combustion chamber may be reduced, having as a direct consequence the reduction of unburnt hydrocarbons deposits that impact on the temperature controllability during a regeneration of the particulate filter.

An embodiment of the present disclosure provides that the apparatus may further be configured to determine a fuel requested quantity, and actuate the internal recirculation strategy, if the determined value of the parameter is equal to or higher than the predetermined threshold value thereof and the determined fuel requested quantity is lower than a predetermined threshold value thereof. Thanks to this solution, the same effects disclosed above may be achieved also in the engine operating conditions wherein the warm-up phase of the exhaust system is ended, but an engine torque requested by the driver through the accelerator pedal is low, namely lower than a pre-calibrated threshold value thereof.

An embodiment of the present disclosure provides that the parameter may be a temperature value of a coolant of the internal combustion engine. As a matter of fact, being the coolant temperature representative of the ambient environment temperature and the exhaust gas temperature of the byproducts of combustion exhausted from the combustion chamber, this aspect of the present disclosure provides a reliable solution for determining a potential condensation in the mixture of fresh air and exhaust gas which passes the compressor to be disposed in the combustion chamber.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
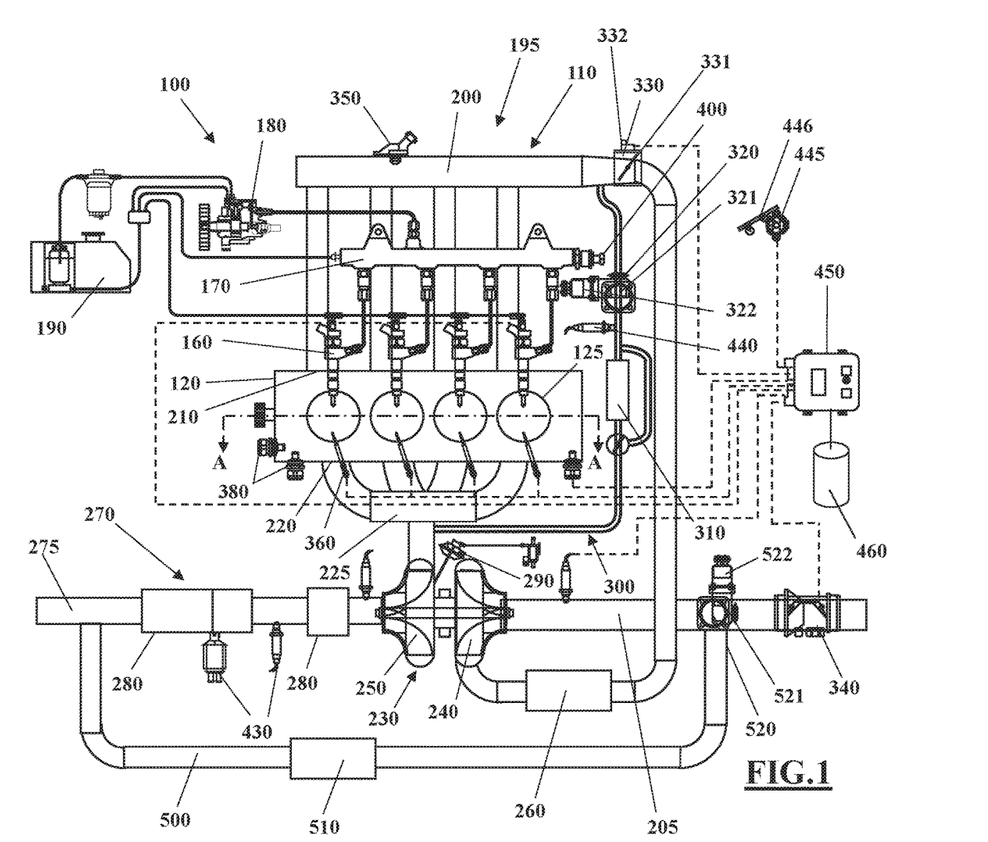
FIG. 1 schematically shows an automotive system.
Figure 2:
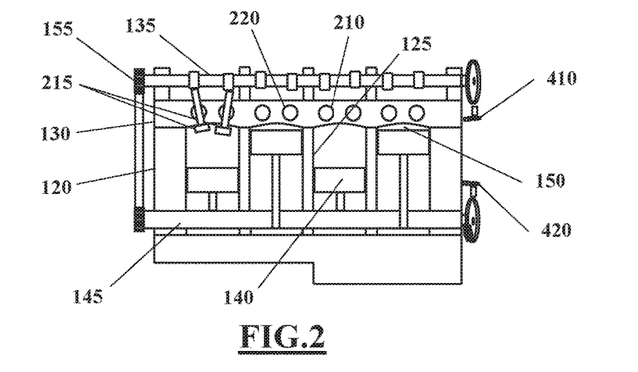
FIG. 2 is section A-A of FIG. 1.

Some embodiments may include an automotive system 100, as shown in FIGS. 1 and 2, that includes an internal combustion engine (ICE) 110, for example a compression-ignition engine (e.g. Diesel) or a spark-ignition engine (e.g. gasoline). The ICE 110 have an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215', 215", actuated by a respective camshaft 135', 135" rotating in time with the crankshaft 145. The valves 215', 215" selectively allow air into the combustion chamber 150 from the intake port 210 and alternately allow exhaust gases to exit through an exhaust port 220. In some examples, a cam phaser 155 may selectively vary the timing between the camshaft 135', 135" and the crankshaft 145.

More in detail, the valves 215',215" may be included in a valve assembly which may include an intake valve 215' located in the intake port 210, an exhaust valve 215" located in the exhaust ports 220, an intake valve lift mechanism 216' supported on the cylinder head 130 and engaged with the intake valve 215', an exhaust valve lift mechanism 216" supported on the cylinder head 130 and engaged with the exhaust valve 215", an intake camshaft 135' supported for rotation on the cylinder head 130 and engaged with the intake valve lift mechanism 216' and an exhaust camshaft 135" supported for rotation on the cylinder head 130 and engaged with the exhaust valve lift mechanism 216". The intake camshaft 135' may include intake cam lobes 136' engaged with each of the intake valve lift mechanism 216'. The intake camshaft 135' may include an intake cam phaser and the intake valve lift mechanism 216' may take a variety of forms including, but not limited to, conventional or variable valve lift mechanisms.

Figure 3:
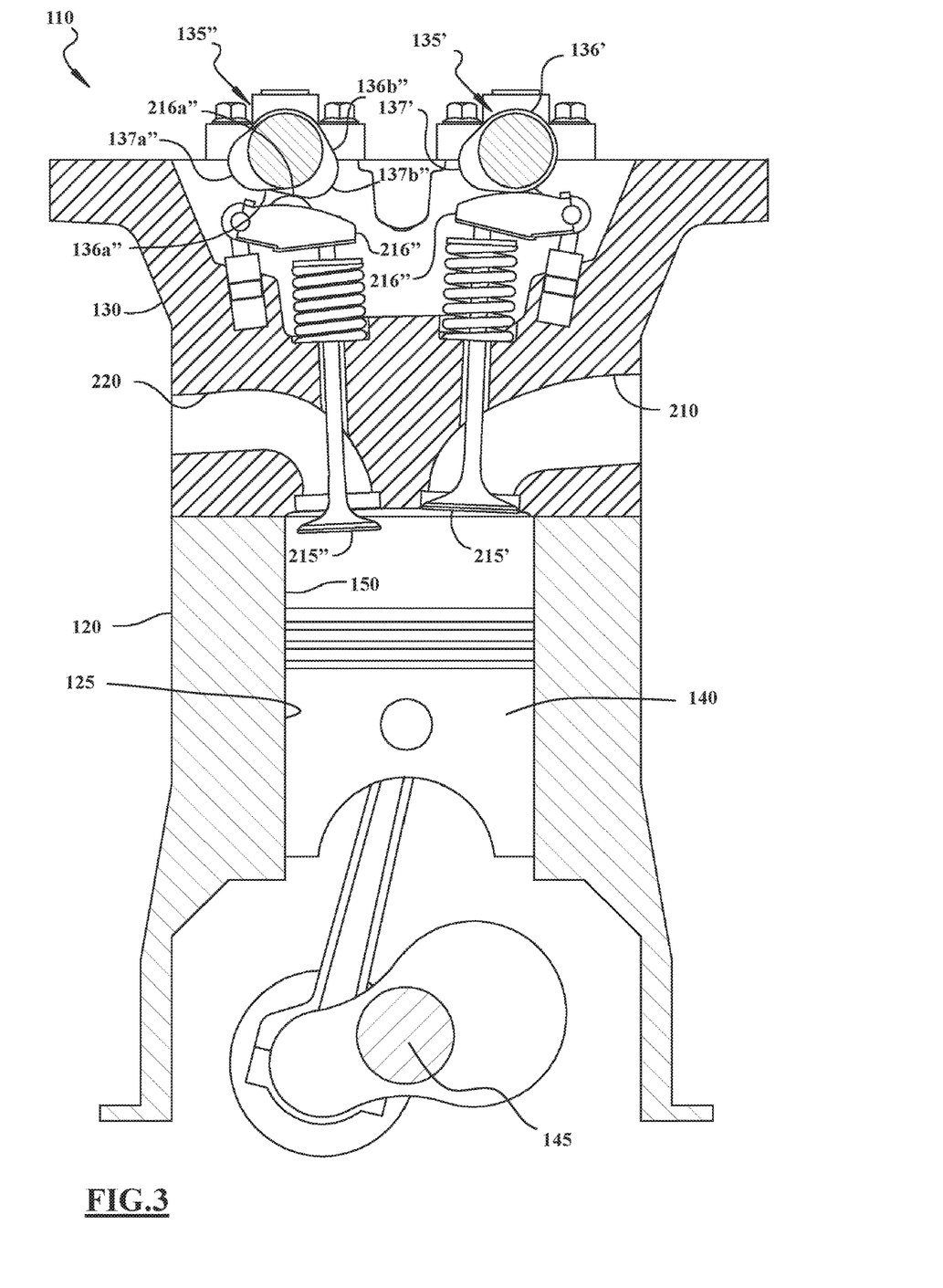
FIG. 3 is a schematic section view of an internal combustion engine according to the present disclosure.

By way of an example, the exhaust valve lift mechanism 216" may form hydraulically actuated deactivating valve lift mechanisms operable in first and second modes. In the present non-limiting example, and as seen in FIG. 3, the exhaust valve lift mechanism 216" may be in the form of a rocker arm including a pair of outer arms, an inner arm including a roller 216a" and a locking mechanism selectively coupling the outer arms to the inner arm. The locking mechanism may be switched between locked and unlocked positions by a pressurized fluid supply. The locking mechanism may be normally biased to the unlocked position for operation in the second mode. The locking mechanism may secure the outer arms for displacement with the inner arm during the first mode and may allow relative displacement between the outer arms and the inner arm during the second mode.

The exhaust camshaft 135" may include a first exhaust cam lobe 136a" engaged with each of the outer arms and a second exhaust cam lobe 136b" may be located between the first exhaust cam lobes 136a" and engaged with the inner arm. Each of the first exhaust cam lobes 136a" may define an EGR lift region 137a" at least partially rotationally aligned with an intake lift region 137' defined by a corresponding one of the intake cam lobes 136'. The second exhaust cam lobes 136b" may define exhaust lift regions 137b" rotationally offset from the EGR lift region 137a" and the intake lift regions 137'.

As seen in FIG. 3, the lift regions 137a", 137b", 137' may generally be defined as regions of the cam lobes 136a", 136b", 136' including lobe peaks that extend from a base circle region to provide valve lift. The exhaust valve 215" may be displaced to an open position when the peak of the second exhaust cam lobe 136b" engages the exhaust valve lift mechanism 216" during both the first and second modes. The exhaust valve 215" may be displaced to an open position when the peaks of the first exhaust cam lobes 136a" engage the exhaust valve lift mechanism 216" during the first mode and the exhaust valve 215" may remain in the closed position when the peaks of the first exhaust cam lobes 136a" engage the exhaust valve lift mechanism 216" during the second mode.

An entirety or a partiality of the opening of the exhaust valve 215" by the EGR lift region 137a" during the first mode may occur while a corresponding intake valve 215' (i.e., intake valve for the same cylinder) is open.

By way of an alternative, the exhaust camshaft 135" may include a multi-lobed (bi-lobed or three-lobed) cam. By way of another alternative, the exhaust camshaft 135" may include an exhaust cam phaser (not shown) and the exhaust valve lift mechanism 216" may take a variety of forms including, but not limited to, conventional or variable valve lift mechanisms.

The exhaust cam phaser may include an outer sprocket connected to a timing chain and an inner rotor (connected to the exhaust camshaft 135") that varies the valve timing by adjusting the rotation angle of the exhaust camshaft 135". This inner rotor for example consists of a set of lobes, and oil fills the space between the outer housing and the lobes. In this case, the exhaust cam phaser is an oil-pressure-actuated (OPA) system. By way of an alternative, the exhaust cam phaser may be an electrically-actuated (EVCP) system.

The exhaust gasses coming from the combustion chamber 150 are directed into an exhaust gas after-treatment system 270. The exhaust gas after-treatment system 270 may include an exhaust manifold 225 in fluid communication with the exhaust port(s) 220, which collects the exhaust gasses and directs them into and exhaust gas line 275 having one or more exhaust after-treatment devices 280. The after-treatment devices 280 may be any device configured to change the composition of the exhaust gases. Some examples of after-treatment devices 280 include, but are not limited to, catalytic converters (two and three ways), oxidation catalysts, lean NOx traps, hydrocarbon adsorbers, selective catalytic reduction (SCR) systems, and particulate filters.

The air may be provided to the air intake port(s) 210 through an air intake system 195. The air intake system 195 may include an intake manifold 200 in communication with the air intake port(s) 210 and an air intake duct 205 providing air from the ambient environment to the intake manifold 200. An intake valve 330 may be disposed in the intake duct 205. The intake valve 330 may include a movable valve member 331, for example a throttle body, and an electrical actuator 332 that moves the valve member 331 to regulate the mass flow rate of the air directed into the manifold 200.

The air intake system 195 cooperates with a turbocharger 230, such as for example a variable-geometry turbocharger, having a compressor 240 rotationally coupled to a turbine 250, wherein the compressor 240 is located in the intake duct 205 and the turbine in the exhaust gas line 275. Rotation of the (wheels of) compressor 240 increases the pressure and temperature of the air in the intake duct 205 and manifold 200. An intercooler 260, disposed in the intake duct 205 between the compressor 240 and the intake manifold 200, may reduce the temperature of the air. The turbine 250 rotates by receiving exhaust gases from the exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes of the turbine 250 to alter the flow of the exhaust gases through it.

The ICE 110 may further be provided with an exhaust gas recirculation (EGR) system for recirculating part of the exhaust gasses back into the combustion chamber 150. The EGR system may include an internal exhaust gas recirculation system (internal EGR system), wherein the exhaust gas recirculation may be performed directly in the combustion chamber 150. In practice, the internal EGR may be performed by means of a re-opening the exhaust valve 215" during an intake stroke of the piston 140, namely while the intake valve 215' is open. In the example shown in FIG. 3, the internal EGR may be obtained operating the exhaust valve lift mechanism 216" in the first mode.

By way of an alternative example, when the internal EGR is accomplished via exhaust cam phaser, the exhaust camshaft 135" is actuated in such a way to twist to a retarded position, delaying exhaust valve 215" closure by a few degrees while the intake stroke of the piston 140 occurs. In each of the above disclosed cases, the internal EGR is actuated by a variable valve (exhaust valve) actuation (VVA) which allows the further opening of the exhaust valve 215" during the intake stroke of the piston 140 (additional with respect to the main opening during the exhaust stroke of the piston 140) and, therefore, have some exhaust gas re-breath in the combustion chamber 150 to decrease the NO$_x$ emissions and to increase the overall temperature of the exhaust gas.

The EGR system may further include a short route, or high-pressure (HP), EGR system. The HP-EGR system may include an HP-EGR pipe 300 coupled between the exhaust manifold 225 and the intake manifold 200. More specifically, the HP-EGR pipe 300 branches from the exhaust manifold 225, or from a point of the exhaust gas line 275 located upstream of the turbine 250, and leads in a point of the intake duct 205 located downstream of the compressor 240, particularly between the intake manifold 200 and the intake valve 330. The HP-EGR pipe 300 may be provided with an HP-EGR cooler 310 to reduce the temperature of the exhaust gases flowing therein. An HP-EGR valve 320 may be disposed in the HP-EGR pipe 300. The HP-EGR valve 320 may include a movable valve member 321 and an electrical actuator 322 that moves the valve member 321 to regulate a mass flow rate of the exhaust gases in the HP-EGR pipe 300.

In some embodiments, the EGR system may further include a long-route, or low-pressure (LP), EGR system. The LP-EGR system may include a LP-EGR pipe 500 coupled between the exhaust manifold 225 and the intake manifold 200. More specifically, the LP-EGR pipe 500 branches from a point of the exhaust gas line 275 located downstream of the turbine 250, particularly downstream of the after-treatment devices 280, and leads in a point of the intake duct 205 located upstream of the compressor 240. The LP-EGR pipe 500 may be provided with a LP-EGR cooler 510 to reduce the temperature of the exhaust gases flowing therein. A LP-EGR valve 520 may be disposed in the LP-EGR pipe 500. The LP-EGR valve 520 may include a movable valve member 521 and an electrical actuator 522 that moves the valve member 521 to regulate a mass flow rate of the exhaust gases in the LP-EGR pipe 500.

Figure 4:
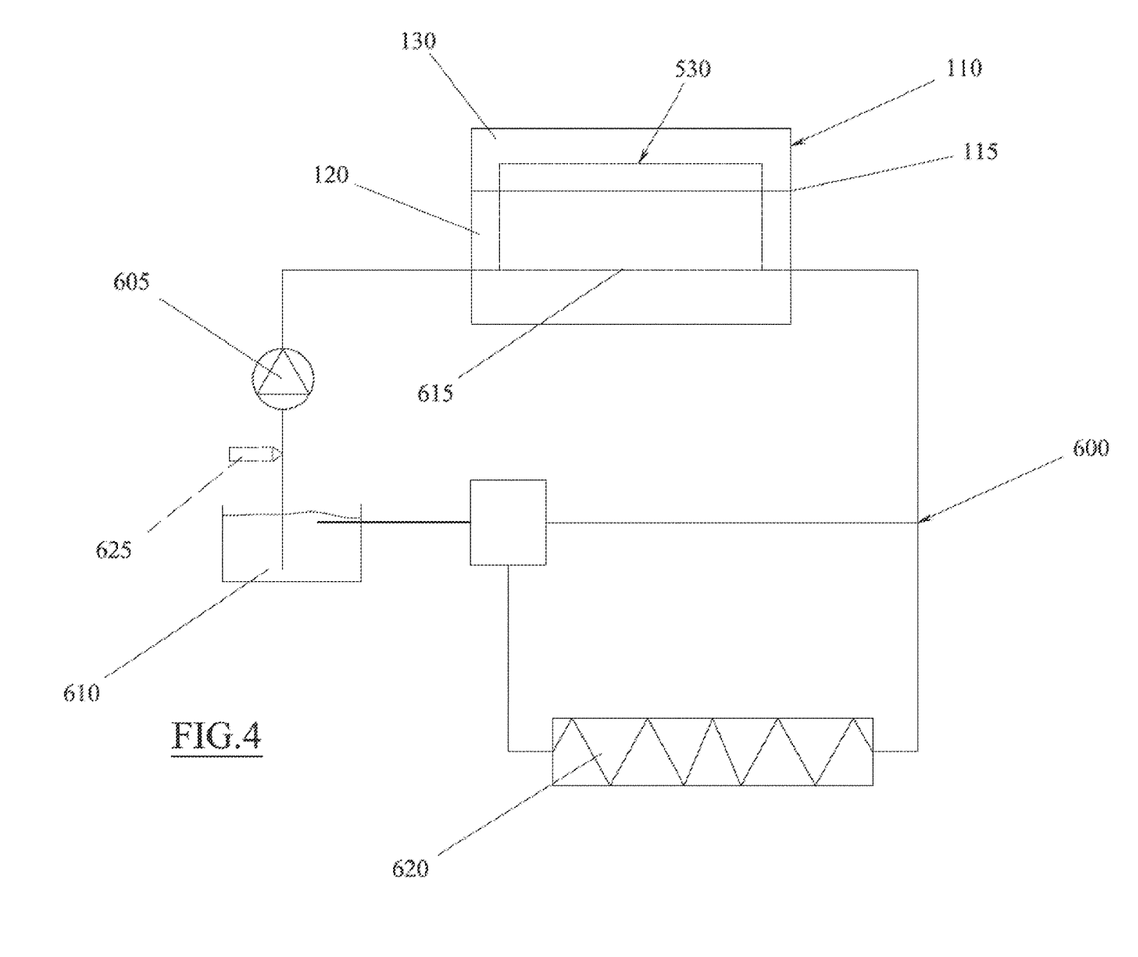
FIG. 4 is a schematic view of an engine cooling system according to the present disclosure.

The internal combustion engine system 100 may further include an engine cooling circuit 600 for cooling the ICE 110. The engine cooling circuit 600 schematically includes a coolant pump 605 that delivers a coolant, typically a mixture of water and antifreeze, from a coolant tank 610 to a plurality of cooling channels 615 internally defined by the engine block 120 and by the cylinder head 130, and a radiator 620 for cooling down the coolant, once it has passed through the cooling channels 615 and before it returns to the coolant tank 610. Also in this case, those skilled in the art will recognize that the cooling channels 615, simply schematized as a single channel in the accompanying figures, are actually configured to define a much more complicate circuit within the engine block 120 and the cylinder head 130.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340 located in the intake duct 205 upstream of the LP-EGR valve 520, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an HP-EGR temperature sensor 440, a coolant temperature sensor 625, which may be present on the coolant circuit 600, and an accelerator pedal position sensor 445. Furthermore, the ECU 450 may generate output signals to various control devices that are arranged to control the operation of the ICE 110, including, but not limited to, the fuel injectors 160, the intake valve actuator 332, the HP-EGR valve actuator 322, the LP-EGR valve actuator 522, the VGT actuator 290, the locking mechanism of the exhaust valve lift mechanism 216" and/or the exhaust gas cam phaser and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system 460 and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analogue and/or digital signals to/from the various sensors and control devices. The program may embody the methods disclosed herein, allowing the CPU to carryout the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an on-board computer, or any processing module that might be deployed in the vehicle.

The ECU 450 may be configured to perform a condensation preventing strategy which interrupts a flowing of exhaust gas through the EGR pipe 500 if a condensation in the mixture of fresh air and exhaust gas supplied to the compressor 240 is expected. For example a condensation of the exhaust gasses may occur due to the lowering of the temperature of the exhaust gas to or below the dew point thereof. Cooling of exhaust gas passing through the LP-EGR cooler 510 of the LP-EGR pipe 500 may lower the temperature of the exhaust gas to or below the dew point of the exhaust gas. Again, fresh air being drawn through the intake valve 330 mixes with (relatively) warm exhaust gas from the LP-EGR valve 520 and the temperature of the fresh air/exhaust gas mixture may be less than the dew point of the mixture. Condensation droplets may cause corrosion and erosion of various components of the ICE 110 that are contacted by the condensation droplets, in particular the wheels of the compressor 240.

An aim of the preventing condensation strategy is that of preventing the condensation of the exhaust gas, for example in both the occurrences above disclosed. It is observed that a parameter indicative of the temperature of the exhaust gas and, in particular, of the temperature of the resulting mixture of fresh air and exhaust gas supplied to the compressor 240, may be the temperature of the coolant circulating in the coolant circuit 600. As a matter of fact, the coolant temperature is substantially representative of the equilibrium temperature of the ambient environment temperature and the exhaust gas temperature of the byproducts of combustion exhausted from the combustion chamber 150.

Figure 5:
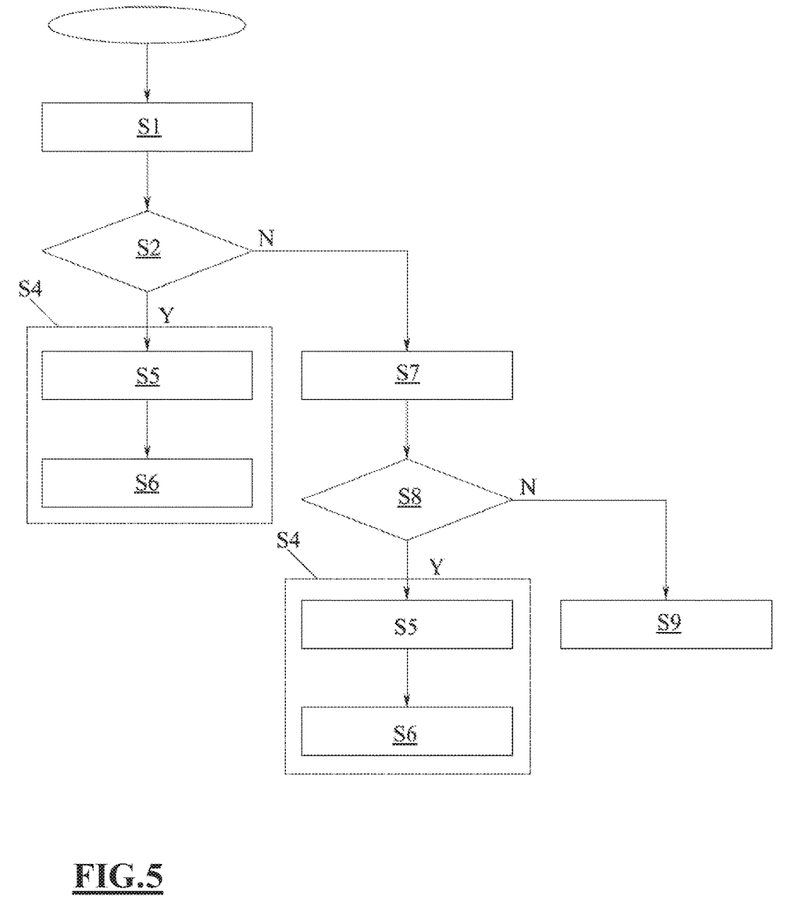
FIG. 5 is a flowchart representing an embodiment of a method of operating the internal combustion engine of FIG. 3.

According to the condensation preventing strategy, the ECU 450 may be configured to determine (block S1) a value of the coolant temperature, by way of an example the ECU 450 is configured to measure, with the coolant temperature sensor 625, the value of the coolant temperature. By way of an alternative the coolant temperature may be estimated, as known for the skilled person, for example on the basis of engine operating points (i.e. engine speed and engine torque).

Again, the ECU 450 is configured to compare (block S2) the determined value of the coolant temperature with a first threshold value thereof. The first threshold value may be determined by means of test performed during a calibration phase of the ICE 110 and stored in the memory system. Again, the ECU 450 is configured to compare (block S2) the determined value of the coolant temperature with a second threshold value thereof. The second threshold value may be determined by means of test performed during a calibration phase of the ICE 110 and stored in the memory system 460. The second threshold value may be less than the first threshold value. If the determined value of the coolant temperature is lower than the first threshold value and, for example, higher than the second threshold value, then a potential condensation upstream of the compressor 240 may occur, therefore the condensation preventing strategy provide for the ECU 450 to activate (block S4) an internal EGR strategy.

The internal EGR strategy may provide for the ECU 450 to interrupt (block S5) the flowing of exhaust gas through the EGR pipe 500. The interruption of the flowing of exhaust gas through the EGR pipe 500 can be actuated by the ECU 450 by actuating and regulating the valve member 521 of the LP-EGR valve 520 so that only fresh air is supplied to the ICE 110. Again, the internal EGR strategy may provide for the ECU 450 to open (block S6) an exhaust valve 215" during an intake stroke of a piston 140.

In practice, the internal EGR strategy may provide for the ECU 450 for actuating an internal EGR as above disclosed, for example obtained actuating the locking mechanism of the exhaust valve lift mechanism 216" in the first mode or actuating the exhaust cam phaser to twist the exhaust camshaft 135" to its retarded position while the intake stroke of the piston 140 occurs.

The ECU 450 may be configured to monitor (continuously determine) the coolant temperature and to maintain the activation of the internal EGR strategy at least until the coolant temperature is lower than the first threshold value, preventing the usage of the LP-EGR pipe 500.

The test performed during the calibration phase of the ICE 110 for retrieving the first threshold value may provide for a technician to execute a calibration method on at least one test internal combustion engine, for example an internal combustion engine which is equal to the ICE 110, equipped with a device suitable to detect the presence of condensation droplets positioned upstream of the compressor. Such calibration method may include: starting the internal combustion engine (according a cold start thereof) to allow the flowing of exhaust gas through the EGR pipe 500 and measuring the coolant temperature during the warm-up phase of the internal combustion engine; monitoring or detecting the presence of condensation droplets, by means of the above the device, and setting the first threshold value as the value of the coolant temperature above which a condensation droplets detection is not observed; and storing the first threshold value in the memory system 460.

For example, the first threshold value may be representative of the temperature of the mixture of fresh air and recirculated exhaust gas above which there is no condensation of the mixture. By way of an example, the first threshold value may be equal to 50° C.

When the coolant temperature gets equal to or higher than the first threshold value, the ECU 450 may be configured to deactivate the internal EGR strategy, to allow the flowing of exhaust gas through the EGR pipe 500, by the actuation and regulation of the valve member 521 of the LP-EGR valve 520 so that a mixture of fresh air and exhaust gas is supplied to the ICE 110, and closing the exhaust valve 215" during an intake stroke of a piston 140, for example by actuating the locking mechanism of the exhaust valve lift mechanism 216" in the second mode or actuating the exhaust cam phaser to re-twist the exhaust camshaft 135" to a standard position.

By way of an alternative, when the coolant temperature gets equal to or higher than the first threshold value, the ECU 450 may be configured to maintain the activation of the internal EGR strategy and to deactivate the internal EGR system activating the LP-EGR system only if a further disabling condition is fulfilled. To do so, by way of an example, the ECU 450 may be configured to determine (block S7) a fuel requested quantity. In particular, the fuel requested quantity is the fuel quantity used to operate the ICE 110 following an engine torque request coming from a driver through an accelerator pedal 446. To operate the ICE 110, as a matter of fact, the ECU 450 is generally configured to command the fuel injector 160 to inject the determined fuel requested quantity into the corresponding cylinder 140.

By way of an example, the ECU 450 may be configured to determine the fuel requested quantity according to an open-loop control strategy based on control parameters such as the engine torque requested by the driver through the accelerator pedal 446, or based on other logics.

The ECU 450 is then configured to compare (block S8) the determined fuel requested quantity with a threshold value thereof. The threshold value may be determined by a test performed during a calibration phase of the ICE 110 and stored in the memory system 460. By way of an example, the threshold value of the fuel requested quantity may be provided as an output of a pre-calibrated map which receives as input an engine speed, namely the actual engine speed (i.e. the rotational speed of the crankshaft 145). This second map may be pre-determined during experimental activities and stored in the memory system 460.

The threshold value of the fuel requested quantity may correspond to the maximum fuel requested quantity for the actual engine speed accounting for the exhaust gas quantity recirculated by means of the internal EGR system. If the fuel requested quantity is higher than the threshold value (and the coolant temperature is equal to or higher than the first threshold value), the ECU 450 is configured to maintain the activation or to activate the condensation preventing strategy as above disclose.

In practice, the ECU 450 activates the internal EGR interrupting the flow of exhaust gas through the EGR pipe 500 and opening the exhaust valve 215" during an intake stroke of a piston (140) of the internal combustion engine (110).

The ECU 450 may be configured to monitor (continuously determine) the fuel requested quantity and to maintain the activation of the internal EGR strategy (preventing the usage of the LP-EGR pipe 500) until the fuel requested quantity is lower than the threshold value; otherwise, when the fuel requested quantity gets equal to or higher than the threshold value, the ECU 450 may deactivate the internal EGR strategy (block S9) to allow the flowing of exhaust gas through the EGR pipe 500 and closing the exhaust valve 215" during an intake stroke of a piston 140.

In practice, when the coolant temperature is lower than the first threshold value (and higher than the second threshold value) the EGR system may be configured to perform an exhaust gas recirculation (only) by the internal EGR system. When the coolant temperature gets equal to or higher than the first threshold value and the engine torque requested by the driver through the accelerator pedal 446 is low, namely lower than a pre-calibrated threshold value thereof, (i.e. the fuel requested quantity is lower than the threshold value thereof) the EGR system may be configured to perform an exhaust gas recirculation (only) by internal EGR system. When the coolant temperature is equal to or higher than the first threshold value and the engine torque requested by the driver through the accelerator pedal 446 is middle-high, namely equal to or higher than the pre-calibrated threshold value thereof (i.e. the fuel requested quantity is equal to or higher than the threshold value thereof) the EGR system may be configured to perform (block S9) an exhaust gas recirculation by means of the LP-EGR system (and/or the HP-EGR system), as usually known.

In practice, thanks to the disclosed solution, when a potential condensation of the exhaust gas along the LP-EGR pipe 500 is estimated, the LP-EGR system may by-passed (or deactivated) and the exhaust gas recirculation may be performed by the disclosed internal EGR system. This solution make unnecessary or eliminates the usage of the HP-EGR system which, therefore, may be removed from the layout of the ICE 110.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an internal combustion engine having a turbocharger and an exhaust gas recirculation pipe fluidly connecting an exhaust gas line to an air intake duct upstream of a compressor of the turbocharger, the method comprising:
   determining a value of a parameter indicative of a temperature of an exhaust gas;
   measuring a temperature value of a coolant of the internal combustion engine, wherein the parameter is the temperature value of the coolant; and
   actuating an internal recirculation strategy of the exhaust gas, if the determined value is lower than a predetermined threshold value thereof, wherein the internal recirculation strategy comprises:
   interrupting a flowing of exhaust gas through the exhaust gas recirculation pipe; and opening an exhaust valve during an intake stroke of a piston of the internal combustion engine.

2. The method according to claim 1, further comprising:
determining a fuel requested quantity; and
actuating the internal recirculation strategy, if the determined value of the parameter is equal to or higher than the predetermined threshold value thereof and the determined fuel requested quantity is lower than a predetermined threshold value thereof.

3. A non-transitory computer readable medium comprising program code, which when executed on a computer, performs the method according to claim 1.

4. An electronic control unit for an internal combustion engine having a reciprocating piston defining a combustion chamber and exhaust gas valve allowing exhaust gas to exit the combustion chamber during an exhaust stroke of the piston, a turbocharger and an exhaust gas recirculation pipe fluidly connecting an exhaust gas line to an air intake duct upstream of a compressor of the turbocharger, wherein the electronic control unit is configured to:
determine a value of a parameter indicative of a temperature of an exhaust gas; and
actuate an internal recirculation strategy of the exhaust gas, if the determined value is lower than a predetermined threshold value thereof, wherein the internal recirculation strategy includes interrupting a flowing of exhaust gas through the exhaust gas recirculation pipe, and opening the exhaust valve during an intake stroke of the piston,
wherein the internal combustion engine includes an engine cooling system having a circulating coolant provided to cool the internal combustion engine, wherein the electronic control unit is further configured to: measure a temperature value of the coolant and use the temperature value as the parameter.

5. The electronic control unit according to claim 3, wherein the electronic control unit is further configured to:
determine a fuel requested quantity to be injected into the combustion chamber; and
actuate the internal recirculation strategy, if the determined value of the parameter is equal to or higher than the predetermined threshold value thereof and the determined fuel requested quantity is lower than a predetermined threshold value thereof.

6. An internal combustion engine comprising:
a reciprocating piston defining a combustion chamber having an exhaust gas valve allowing exhaust gas to exit the combustion chamber during an exhaust stroke of the piston;
a turbocharger and an exhaust gas recirculation pipe fluidly connecting an exhaust gas line to an air intake duct upstream of a compressor of the turbocharger;
an electronic control unit (450) configured to:
determine a value of a parameter indicative of a temperature of an exhaust gas;
actuate an internal recirculation strategy of the exhaust gas, if the determined value is lower than a predetermined threshold value thereof, wherein the internal recirculation strategy comprises interrupting a flowing of exhaust gas through the exhaust gas recirculation pipe, and opening the exhaust valve during an intake stroke of the piston; and
an engine cooling system having a circulating coolant provided to cool the internal combustion engine, wherein the parameter is a temperature value of the coolant.

7. The internal combustion engine according to claim 6, wherein the electronic control unit is further configured to:
determine a fuel requested quantity to be injected into the combustion chamber; and
actuate the internal recirculation strategy, if the determined value of the parameter is equal to or higher than the predetermined threshold value thereof and the determined fuel requested quantity is lower than a predetermined threshold value thereof.

* * * * *